(12) United States Patent
Marchal et al.

(10) Patent No.: US 10,950,840 B2
(45) Date of Patent: Mar. 16, 2021

(54) MODULE OF PRIMARY CELLS AND DEVICE FOR STORING ELECTRICAL ENERGY

(71) Applicant: RENAULT s.a.s., Boulogne-Billancourt (FR)

(72) Inventors: Caroline Marchal, Paris (FR); Philippe Recouvreur, Montrouge (FR); Fabrice Bidault, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/535,904

(22) PCT Filed: Nov. 27, 2015

(86) PCT No.: PCT/FR2015/053250
§ 371 (c)(1),
(2) Date: Jun. 14, 2017

(87) PCT Pub. No.: WO2016/097517
PCT Pub. Date: Jun. 23, 2016

(65) Prior Publication Data
US 2018/0351151 A1   Dec. 6, 2018

(30) Foreign Application Priority Data
Dec. 18, 2014  (FR) .................................... 14 62736

(51) Int. Cl.
| | | |
|---|---|---|
| *H01M 2/20* | (2006.01) | |
| *H01M 10/04* | (2006.01) | |
| *H01M 10/617* | (2014.01) | |
| *B60L 3/00* | (2019.01) | |
| *B60L 58/16* | (2019.01) | |
| *B60L 58/21* | (2019.01) | |
| *B60L 50/64* | (2019.01) | |
| *H01M 10/647* | (2014.01) | |
| *H01M 10/625* | (2014.01) | |
| *H01M 10/0525* | (2010.01) | |

(52) U.S. Cl.
CPC .......... *H01M 2/206* (2013.01); *B60L 3/0046* (2013.01); *B60L 50/64* (2019.02); *B60L 58/16* (2019.02); *B60L 58/21* (2019.02); *H01M 10/0445* (2013.01); *H01M 10/617* (2015.04); *B60L 2240/545* (2013.01); *H01M 10/0525* (2013.01); *H01M 10/625* (2015.04); *H01M 10/647* (2015.04); *H01M 2220/20* (2013.01); *Y02E 60/10* (2013.01); *Y02T 10/70* (2013.01)

(58) Field of Classification Search
CPC ........... H01M 10/0445; B60L 11/1879; B60L 11/1864
See application file for complete search history.

(56) References Cited

U.S. PATENT DOCUMENTS

| | | |
|---|---|---|
| 2013/0196205 A1 | 8/2013 | Silk et al. |
| 2014/0113165 A1 | 4/2014 | Silk et al. |
| 2014/0154602 A1 | 6/2014 | Michelitsch |
| 2014/0354212 A1* | 12/2014 | Sugeno ................. B60L 58/22 320/103 |

OTHER PUBLICATIONS

International Search Report dated May 4, 2016 in PCT/FR2015/053250 filed Nov. 27, 2015.
French Preliminary Search Report dated Mar. 17, 2015 in French Patent Application No. 1462736 filed Dec. 18, 2014.

* cited by examiner

*Primary Examiner* — Ladan Mohaddes
(74) *Attorney, Agent, or Firm* — Oblon, McClelland, Maier & Neustadt, L.L.P.

(57) ABSTRACT

A module of elementary electrical energy storage cells includes a first set of elementary cells that are interconnected so as to supply a first voltage in a first voltage range and a second set of elementary cells that are interconnected so as to supply a second voltage in a second voltage range. At least one elementary cell from the second set is arranged between two elementary cells from the first set.

13 Claims, 3 Drawing Sheets

(ART ANTERIEUR)

MODULE OF PRIMARY CELLS AND DEVICE FOR STORING ELECTRICAL ENERGY

The present invention relates to a module of elementary cells and an electrical energy storage device comprising such a module.

The invention also relates to a method for assembling the module of elementary cells and a vehicle comprising such an energy storage device.

A hybrid propulsion or traction vehicle (HEV, hybrid electric vehicle) is generally equipped with a traction internal combustion engine and with an electric traction motor that is powered by an electrical energy storage device embedded on board the vehicle so as to be able to use a plurality of energy sources.

Such an electrical energy storage device, also termed 'pack battery' or else 'battery', is provided with modules comprising elementary electrical energy storage cells, also termed accumulators. More precisely, these cells are generally connected in series and/or in parallel to form these modules, and in particular a high-voltage module and a low-voltage module, to the terminals of each of which a voltage is supplied.

With reference to FIG. 1, in energy storage devices 1 of this kind according to the prior art, such as for example the device described in the application FR2994896, the elementary cells 3a forming the high-voltage module 2a are grouped together in a defined part of these devices 1, and the elementary cells 3b forming the low-voltage module 2b are grouped together in another part of these devices.

Such a configuration of these energy storage devices 1 has the major drawback of creating a temperature disparity between the part of these devices 1 containing the high-voltage module 2a and the part in which the low-voltage module 2b is situated. This temperature disparity in these energy storage devices 1 has the direct consequence of causing a reduction in the performance and in the life of such devices 1.

The present invention aims to mitigate these drawbacks of the electricity storage devices comprising these modules from the prior art.

To this end, the invention relates to a module of elementary electrical energy storage cells comprising a first set of elementary cells that are interconnected so as to supply a first voltage in a first voltage range and a second set of elementary cells that are interconnected so as to supply a second voltage in a second voltage range, said at least one elementary cell from the second set being arranged between two elementary cells from the first set.

In other embodiments:
- the elementary cells from the first and second sets are arranged in the module in a succession of elementary cells alternating between at least one elementary cell from the first set and at least one elementary cell from the second set;
- the positive and negative electrical contacts of the elementary cells from the first set are situated on a part of the module that is opposite another part of the module on which the positive and negative electrical contacts of the elementary cells from the second set are located;
- the positive and negative electrical contacts of the elementary cells from the first and second sets are situated on one and the same part of the module;
- the module comprises
  - connection elements from a first group of connection elements that are able to electrically link the electrical contacts of the elementary cells from the first set to one another so as to supply the first voltage;
  - connection elements from a second and from a third group of connection elements that are able to electrically link the electrical contacts of the elementary cells from the second set to one another so as to supply the second voltage, and/or
  - an electrical linking element able to connect a first electrical circuit formed of the elementary cells from the first set and of the connection elements from the first group to a second electrical circuit formed of the elementary cells from the second set and of the connection elements from the second and third groups.
- the module comprises first and second positive voltage terminals supplying the first and the second voltage, respectively, and a third negative voltage terminal.

The invention also relates to an electrical energy storage device comprising at least one such module.

The invention also relates to a method for assembling such a module of elementary cells, comprising a step of arranging at least one elementary cell from a second set of elementary cells that are interconnected so as to supply a second voltage in a second voltage range between two elementary cells from a first set of elementary cells that are interconnected so as to supply a first voltage in a first voltage range.

The method advantageously comprises a step of connecting the electrical contacts of the cells from the first set using connection elements from a first group of connection elements, so as to supply the first voltage, and the electrical contacts of the cells from the second set using connection elements from second and third groups of connection elements, so as to supply the second voltage.

The invention also relates to a motor vehicle, in particular an electric or hybrid motor vehicle, including such an electricity storage device.

Other advantages and features of the invention will become more apparent upon reading the following description of one preferred embodiment, with reference to the figures, given by way of indicative and nonlimiting example:

Figure 1:
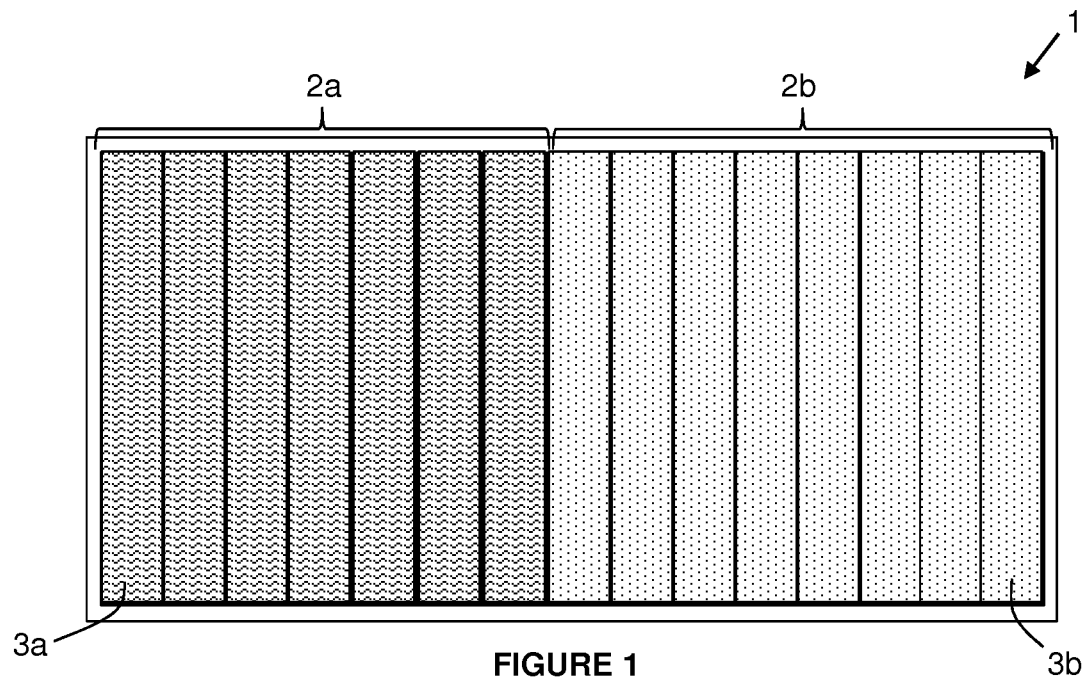
FIG. 1 is a schematic representation of the electricity storage device from the prior art.
Figure 2:
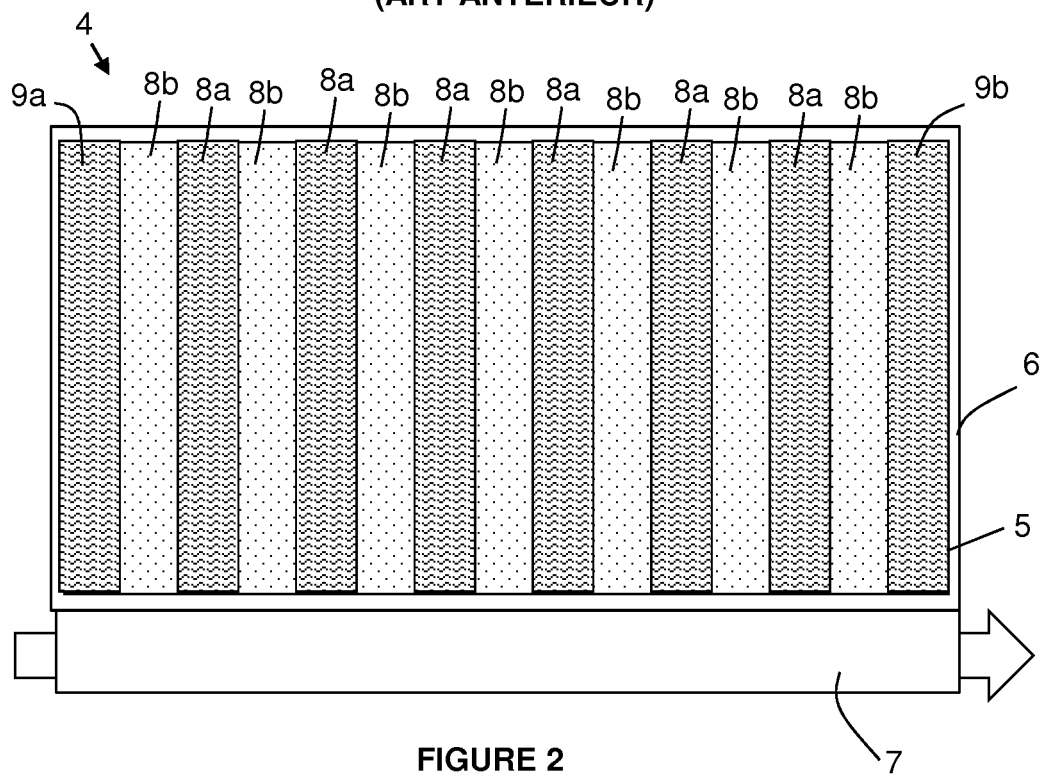
FIG. 2 is a schematic representation of an electricity storage device according to the embodiment of the invention.

In FIG. 1, the electrical energy storage device 4 comprises a module 5 of elementary cells 8a, 9a, 9b, 8b. Such an electrical energy storage device 4 is formed of a housing 6 in which the module 5 of elementary cells 8a, 9a, 9b, 8b is arranged. The function of this housing 6 is to hold and support the module 5, and to ensure that it is sealed with respect to the outside. Such an electrical energy storage device 4 may be arranged on a radiator 7 in which a fluid such as water flows. This radiator 7 participates in the evacuation of calorific energy originating from the device 4, and in particular from the module 5 of elementary cells 8a, 9a, 9b, 8b. It will be noted that such a device 4 may comprise a plurality of modules 5 of elementary cells 8a, 9a, 9b, 8b.

The module 5 is formed of back 12b, front 12a, upper 12c and lower 12d parts, and of first and second lateral parts 12f, 12e. This module 5 comprises elementary cells 8a, 9a, 9b, 8b, which will hereinafter more simply be termed cells 8a, 9a, 9b, 8b. These cells 8a, 9a, 9b, 8b are connected in series and/or in parallel and thus form a set that participates directly in the function of storing and recovering electrical energy. As will be seen hereinafter, this module 5 comprises first and second positive voltage terminals 14a, 14b and a negative voltage terminal 14c. These voltage terminals 14a, 14b, 14c are also termed 'current collectors' or 'voltage points'.

More precisely, this module 5 comprises:
elementary cells 8a, 9a, 9b from a first set of elementary cells having a first voltage range, and
elementary cells 8b from a second set of elementary cells having a second voltage range.

The first and second voltage ranges are different and are chosen from the following voltage ranges: high-voltage and low-voltage. In this embodiment, the voltage range for the cells 8a, 9a, 9b from the first set is the high-voltage range, and that of the cells 8b from the second set is the low-voltage range.

Figure 3:
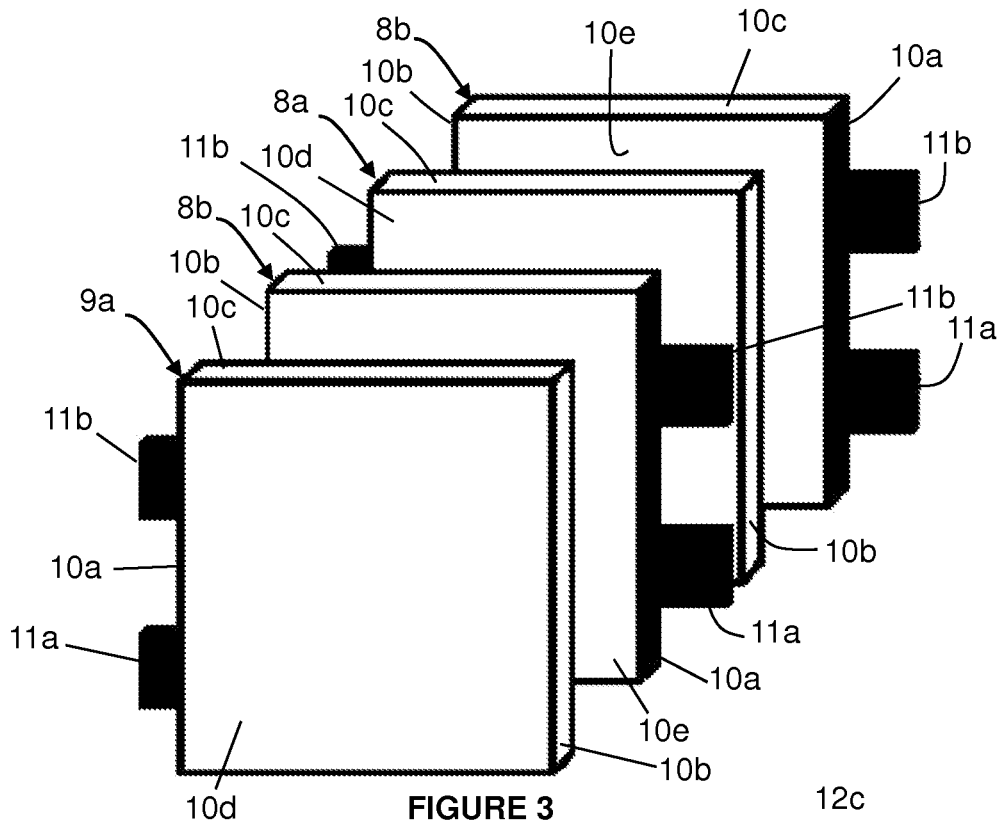
FIG. 3 shows elementary cells from first and second sets of elementary cells of a module of elementary cells according to the embodiment of the invention.

With reference to FIG. 3, each of the cells 8a, 9a, 9b, 8b from the first and second sets may have a rectangular cross section and comprise:
first and second lateral faces 10d, 10e;
front and back faces 10a, 10b, and
upper 10c and lower (not shown) faces.

It will be noted that, in one variant, each of the cells 8a, 9a, 9b, 8b from the first and second sets may have a circular section.

In order to produce/store energy, each cell 8a, 9a, 9b, 8b comprises, in a conventional manner, a cathode and an anode that are separated by an electrolyte. The electrolyte may consist of a polymeric separator of the membrane type, soaked in a liquid polymer electrolyte of the organic solvent with lithium salt type.

The cells 8a, 9a, 9b, 8b from the first and second sets comprise two electrical contacts, such as connection tabs in the form of thin metal sheets having a width slightly smaller than the width of the corresponding cell 8a, 9a, 9b, 8b. Of course, it is readily apparent that each cell 8a, 9a, 9b, 8b from the first and second sets comprises an outer envelope (not shown) in reality, to which the tabs are connected. These electrical contacts 11a, 11b, which have opposing polarities (positive polarity 11a, negative polarity 11b) and are conventionally termed 'connection tabs', are arranged on the front face 10a of each of the cells 8a, 9a, 9b, 8b from the first and second sets.

In FIGS. 2 to 6, the cells 8a, 9a, 9b, 8b from the first and second sets of the module 5 are arranged in parallel with respect to one another in a succession of cells 8a, 9a, 9b, 8b alternating between at least one cell 8a, 9a, 9b from the first set and at least one cell 8b from the second set. Thus, as can be seen in particular in FIGS. 3, 4 and 5, if the succession of cells 8a, 9a, 9b, 8b of this module 5 starts with a cell 8a, 9a, 9b from the first set, the latter is then followed by a cell 8b from the second set, which is itself followed by another cell 8a, 9a, 9b from the first set, this continuing as far as the last cells 8a, 9a, 9b, 8b from the first and second sets.

In this configuration in which each cell 8a, 9a, 9b from the first set is positioned in proximity to or even in contact with each cell 8b from the second set, the heat generated by these cells 8a, 9a, 9b, 8b will be diffused more easily from one cell 8a, 9a, 9b, 8b to the other, thus homogenizing the temperature of the module 5.

Figure 4:
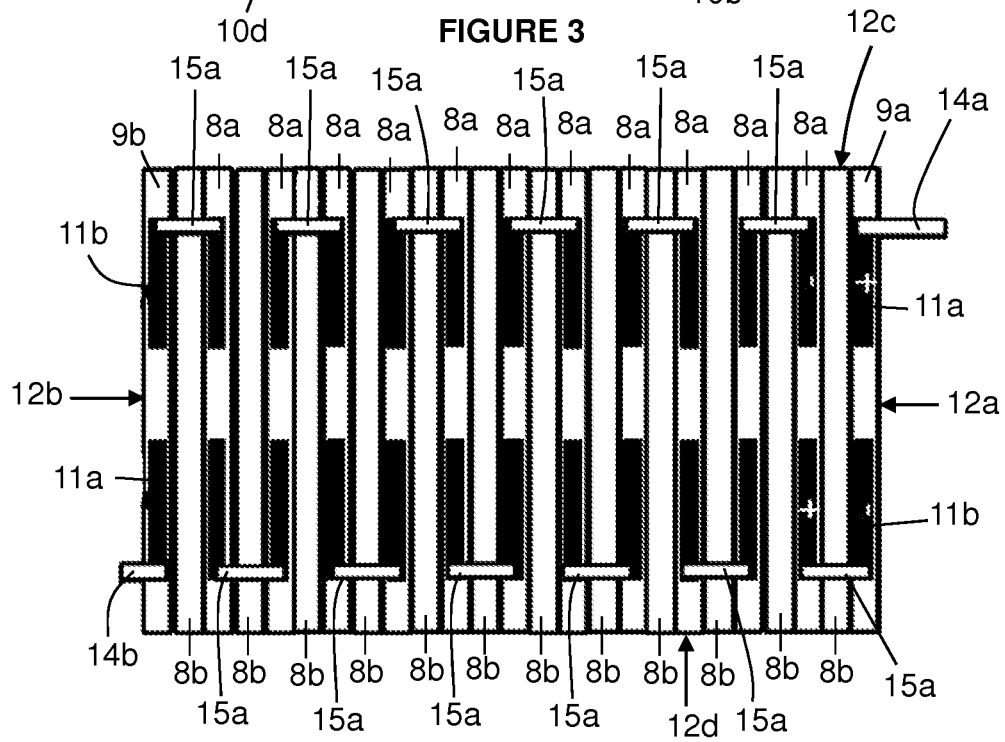
FIG. 4 shows a view of a first lateral part of the module of elementary cells according to the embodiment of the invention.
Figure 5:
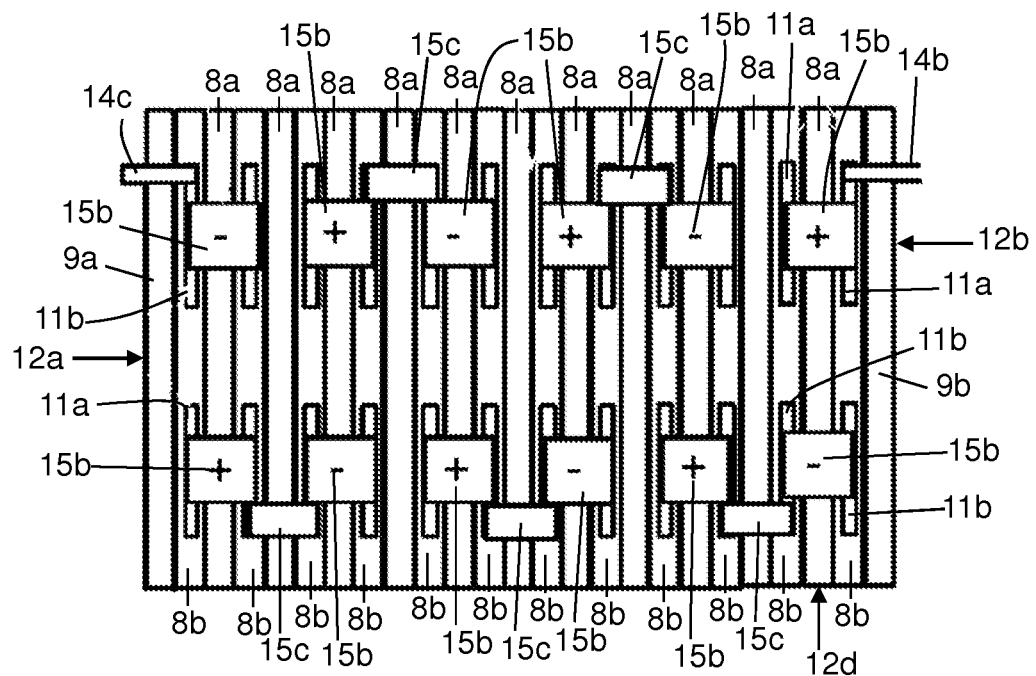
FIG. 5 shows a view of a second lateral part of the module of elementary cells according to the embodiment of the invention.
Figure 6:
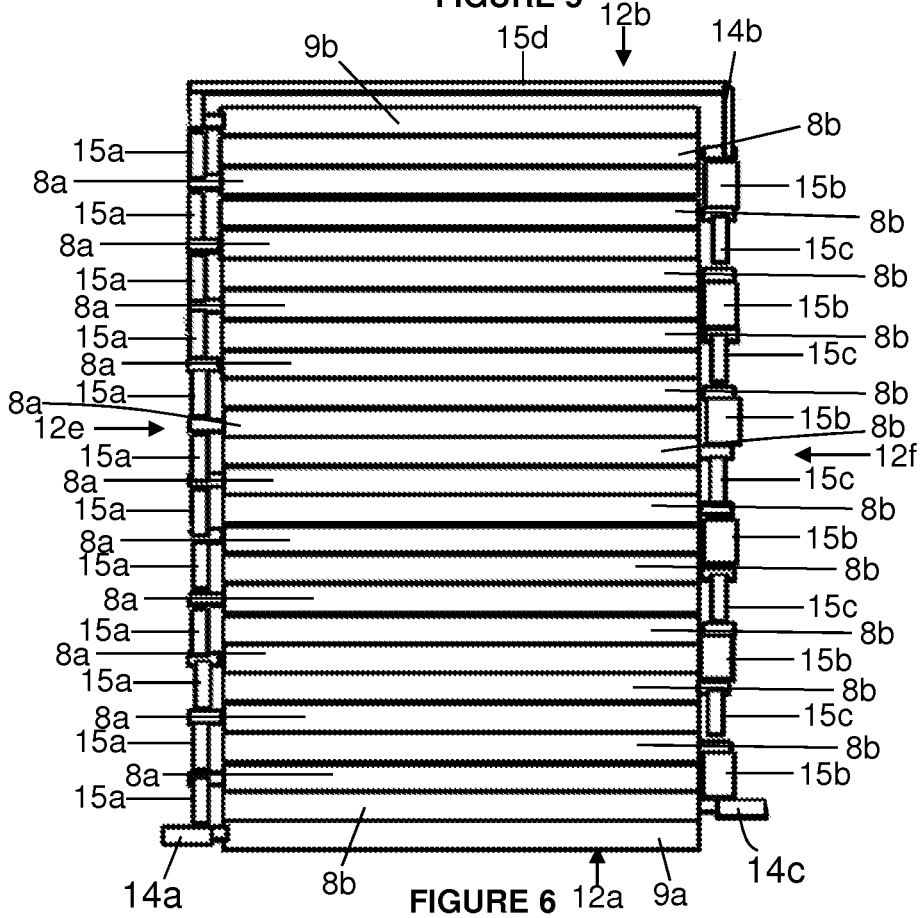
FIG. 6 shows a view of an upper part of the module of elementary cells according to the embodiment of the invention.

For the sake of clarity in FIGS. 4 to 6, the module 5 has been shown with thirteen cells 8a, 9a, 9b from the first set and twelve cells 8b from the second set. In this module 5, as has been seen, the cells 8a, 9a, 9b, 8b from the first and second sets are arranged in parallel with respect to one another in a succession of cells 8a, 9a, 9b, 8b alternating between at least one cell 8a, 9a, 9b from the first set and at least one cell 8b from the second set.

In this configuration, the cells 8a, 9a, 9b belonging to the first set, being greater in number than those belonging to the second set, then form the front 12a and back 12b parts of the module 5, and will hereinafter be termed the first and second end cells 9a, 9b of the module 5. More precisely, the front part 12a of the module 5 is then formed by the first lateral face 10d of the first end cell 9a and, for the back part 12b, by the second lateral face 10e of the second end cell 9b. The cells 8a, 9a, 9b, 8b from the first and second sets, which are arranged side by side, have their first lateral face 10d, which are positioned facing or even adjoining one another, or their second lateral face 10e, which are situated facing or even adjoining one another. More precisely, for each cell 8b from the second set that is situated between two cells 8a, 9a, 9b from the first set, the first and second lateral faces 10d, 10e of this cell 8b from the second set are arranged or even adjoined at the first lateral face 10d of one of these two cells 8a, 9a, 9b from the first set and at the second lateral face 10e of the other cell 8a, 9a, 9b of these two cells 8a, 9a, 9b from the first set, respectively.

In this configuration, the electrical contacts 11a, 11b:
of the cells 8a, 9a, 9b from the first set are located on the first lateral part 12e of the module 5 (and are visible in FIGS. 4 and 6), and
of the cells 8b from the second set are situated on the second lateral part 12f of the module 5 (and are visible in FIGS. 5 and 6).

It is understood that these electrical contacts 11a, 11b may be located on any part 12a to 12f of the module 5, that is to say on the front 12a, back 12b, upper 12c or lower 12d part, the first lateral part 12e or the second lateral part 12f.

In this configuration, the cells 8a, 9a, 9b from the first set are then situated on a part 12e of the module 5 that is opposite (that is to say symmetrical with respect to an axis of symmetry of the module 5) a part 12f of the module 5 on which the electrical contacts 11a, 11b of the cells 8b from the second set are located.

In other variants, the electrical contacts 11a, 11b of the cells 8a, 9a, 9b, 8b from the first and second sets may be arranged on one and the same part 12a to 12f of the module 5, that is to say on the front 12a, back 12b, upper 12c or lower 12d part, the first lateral part 12e or the second lateral part 12f.

The module 5 comprises a plurality of groups of connection elements supporting the high voltages and the low voltages, and which contribute to connecting the cells 8a, 9a, 9b, 8b from the first and second sets in series and/or in parallel, in particular at their electrical contacts 11a, 11b. The connection elements 15a, 15, 15c of these groups are preferably assembled on the electrical contacts 11a, 11b by welding. These elements are conventionally termed 'busbars'.

More precisely, the module 5 comprises a first group of connection elements that is visible in FIGS. 4 and 6. The connection elements 15a from the first group link the cells 8a, 9a, 9b from the first set in series on the first lateral part 12e of the module 5. More precisely, each connection element 15a from the first group is able to provide an electrical link between two cells 8a, 9a, 9b from the first set, in particular between two cells 8a, 9a, 9b close to one another. To this end, this connection element links the electrical contacts 11a, 11b, having opposing polarities, of these two cells 8a, 9a, 9b to one another. In this embodiment, this first group comprises twelve connection elements 15a.

The module 5 comprises, on its second lateral part 12f, second and third groups of connection elements that are visible in FIGS. 5 and 6. The connection elements 15b from the second group link the cells 8b from the second set in parallel. More precisely, two connection elements 15b from the second group of connection elements provide an electrical link between two cells 8b from the second set, in particular between two cells 8b close to one another. To this end, each of these two connection elements 15b links the electrical contacts 11a, 11b, having like polarities, of these two cells 8b to one another. In this embodiment, this second group comprises twelve connection elements 15b.

The cells 8b from the second set, by thus being linked in parallel, then form six bi-cells. These bi-cells are able to be connected in series by the connection elements 15c from the third group of connection elements. Each connection element 15c from the third group then provides an electrical link between two bi-cells from the second set, in particular between two bi-cells close to one another. To this end, the connection element 15c links the electrical contacts 11a, 11b, having opposing polarities, of these two bi-cells to one another and/or the connection elements 15b from the second group that have opposing polarities.

The cells 8a, 9a, 9b from the first set and the connection elements 15a from the first group thus form a first electrical circuit. Likewise, the cells 8b from the second set and the connection elements 15b from the second and third groups form a second electrical circuit.

The module 5 also comprises an electrical linking element 15d, which may also be termed a 'busbar' and which is able to electrically connect the first and second electrical circuits. This electrical linking element 15d is situated on the back part 12b of the module 5 and links the free electrical contact 11a of the bi-cell arranged on the back part 12b of the module 5, i.e. in proximity to the second end cell 9b, to the free electrical contact 11a of the second end cell 9b of the module 5, which has the same polarity. The voltage across the terminals of the second circuit is thus added to that present across the terminals of the first circuit.

Such groups of connection elements make it possible to create different configurations for interconnecting the cells 8a, 9a, 9b, 8b from the first and second sets, while keeping a natural homogenization of the temperature within the module 5 through conduction.

It will be noted that, in the variant in which the electrical contacts 11a, 11b of the cells 8a, 9a, 9b, 8b from the first and second sets are arranged on one and the same part 12a to 12f of the module 5, the various groups of connection elements as well as the electrical linking element 15d are arranged there as well. Thus, in this configuration, the module 5 has a better compactness and in fact has a reduced bulk.

As has been discussed, the module 5 comprises first and second positive voltage terminals 14a, 14b and a negative voltage terminal 14c. The first and second positive voltage terminals 14a, 14b are visible in FIGS. 4 and 6. The first terminal 14a is situated on the first end cell 9a of the module 5 and, more precisely, on the free electrical contact 11a of this first end cell 9a. The second voltage terminal is located on the free electrical contact 11a of the bi-cell arranged on the back part 12b of the module 5 or, by virtue of the electrical linking element 15d, on the free electrical contact 11a of the second end cell 9b.

With reference to FIGS. 5 and 6, the third negative voltage terminal 14c is, for its part, situated on the free electrical contact 11b of the bi-cell arranged on the front part of the module 5, i.e. in proximity to the first end cell 9a.

In this embodiment, the cells 8a, 9a, 9b, 8b from the first and second sets are able to supply a voltage of the order of 3 to 4 V. The first positive voltage terminal 14a is a high-voltage terminal that, under these conditions, is able to supply a voltage of between 45 and 50 V, and preferably a voltage of 48 V. The second positive voltage terminal 14b is a low-voltage terminal that is able to supply a voltage of between 11 and 17 V, and preferably a voltage of 14 V.

Figure 7:
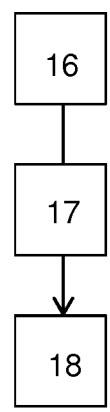
FIG. 7 is a flow chart relating to a method for assembling the module of elementary cells.

One aspect of the invention relates to a method for assembling the module 5 of elementary cells 8a, 9a, 9b, 8b, illustrated in FIG. 7. This method comprises a step 16 of arranging at least one cell 8b from the second set of elementary cells between two cells 8a, 9a, 9b from the first set of elementary cells.

This method may provide an arranging step 16 in which the cells 8a, 9a, 9b, 8b from the first and second sets are positioned in parallel with respect to one another in a succession of cells 8a, 9a, 9b, 8b alternating between at least one cell 8a, 9a, 9b from the first set and at least one cell 8b from the second set.

The method then comprises a step 17 of connecting the electrical contacts 11a, 11b of the cells 8a, 9a, 9b from the first set using the connection elements 15a from the first group, and the electrical contacts 11a, 11b of the cells 8b from the second set using the connection elements 15b, 15c from the second and third groups.

The method thereafter includes a step 18 of linking the first electrical circuit to the second electrical circuit via the electrical linking element 15d.

The present invention is not limited to the embodiment that has been explicitly described, but includes the numerous variants and generalizations thereof contained in the scope of the claims that follow.

The invention claimed is:

1. A module of elementary electrical energy storage cells, the module comprising:
 a first set of elementary cells that are interconnected, each elementary cell of the first set of elementary cells supplying a first voltage in a first voltage range;
 a second set of elementary cells that are interconnected, each elementary cell of the second set of elementary cells supplying a second voltage in a second voltage range, at least one elementary cell from the second set being, arranged between two elementary cells from the first set, and the first voltage being higher than the second voltage;
 connection elements from a first group of connection elements that are located on a first portion of the module and are configured to electrically link positive and negative electrical contacts of the first set of elementary cells to one another so as to supply the first voltage;

connection elements from a second and from a third group of connection elements that are located on a second portion of the module and are configured to electrically link positive and negative electrical contacts of the second set of elementary cells to one another so as to supply the second voltage; and an electrical linking element located on a third portion of the module and configured to connect a first electrical circuit formed of the first set of elementary cells and of the connection elements from the first group to a second electrical circuit formed of the second set of elementary cells and of the connection elements from the second and third groups, wherein the connection elements of the first group of connecting elements, the connection elements of the second and third groups of connecting elements, and the electrical linking element are located on different sides of the module, and the connection elements of the first group of connecting elements and the connection elements of the second and third groups of connecting elements are located on opposite sides of the module.

2. The module as claimed in claim 1, wherein the first and second sets of elementary cells are arranged in the module in a succession of elementary cells alternating between at least one elementary cell from the first set and at least one elementary cell from the second set.

3. The module as claimed in claim 1, wherein the positive and negative electrical contacts of each of the elementary cells of the first set of elementary cells are situated on a part of the module that is opposite another part of the module on which the positive and negative electrical contacts of each of the elementary cells from the second set of elementary cells are located.

4. The module as claimed in claim 1, wherein the positive and negative electrical contacts of the first and second sets of elementary cells are situated on a same part of the module.

5. The module as claimed in claim 1, further comprising:
first and second positive voltage terminals supplying the first and the second voltage, respectively, and a third negative voltage terminal.

6. An electrical energy storage device, comprising:
the module as claimed in claim 1.

7. A method for assembling a module of elementary cells, the method comprising:
arranging at least one elementary cell from a second set of elementary cells that are interconnected between two elementary cells from a first set of elementary cells that are interconnected, each elementary cell of the first set of elementary cells having a first voltage, each elementary cell of the second set of elementary cells having a second voltage, and the first voltage is higher than the second voltage;

electrically linking, by connection elements from a first group of connection elements that are located on a first portion of the module, positive and negative electrical contacts of the first set of elementary cells to one another so as to supply the first voltage;

electrically linking, by connection elements from a second and from a third group of connection elements that are located on a second portion of the module, link positive and negative electrical contacts of the second set of elementary cells to one another so as to supply the second voltage; and connecting, by an electrical linking element located on a third portion of the module, a first electrical circuit formed of the first set of elementary cells and of the connection elements from the first group to a second electrical circuit formed of the second set of elementary cells and of the connection elements from the second and third groups, the connection elements of the first group of connecting elements, the connection elements of the second and third groups of connecting elements, and the electrical linking element being located on different sides of the module, and the connection elements of the first group of connecting elements and the connection elements of the second and third groups of connecting elements being located on opposite sides of the module.

8. A motor vehicle, comprising:
the electrical energy storage device as claimed in claim 6.

9. The module as claimed in claim 1, wherein a total number of elementary cells in the first set of elementary cells is greater than a total number of the elementary cells of the second set of elementary cells.

10. The module as claimed in claim 1, wherein the first portion of the module corresponds to a first lateral side of the module, the second portion of the module corresponds to a second lateral side of the module, and the third portion of the module corresponds to a back of the module.

11. The module as claimed in claim 10, wherein the elementary cells of the first set of elementary cells form a front part and the back part of the module.

12. The module as claimed in claim 1, wherein each elementary cell of the first and second sets of elementary cells includes a single cathode and a single anode separated by an electrolyte.

13. The module as claimed in claim 1, wherein each of the connection elements of the first group of connecting elements connects two elementary cells from the first group of elementary cells that are disposed on opposite sides of an elementary cell of the second set of elementary cells, and each of the connection elements of the second and third groups of connecting elements connects two elementary cells from the second group of elementary cells that are disposed on opposite sides of an elementary cell of the first set of elementary cells.

\* \* \* \* \*